Patented Apr. 23, 1940

2,197,795

UNITED STATES PATENT OFFICE 2,197,795

ALKALINE EARTH METAL GOLD KERATINATES AND PROCESS OF MAKING SAME

Adolf Feldt, Berlin-Charlottenburg, and Adolf Schmitz, Berlin-Friedenau, Germany, assignors to Schering Aktiengesellschaft, a corporation of Germany No Drawing. Application September 9, 1936, Serial No. 99,960. In Germany September 13, 1935

24 Claims. (Cl. 260—113)

This invention relates to a process for the manufacture of therapeutically valuable gold compounds.

The gold compounds of keratins and their degradation products hitherto employed in therapy constitute the water soluble alkali metal salts of these relatively difficultly soluble carboxylic acids.

The present invention is based on our discovery that the alkaline earth metal salts of these gold keratinic acids also possess outstanding therapeutic properties. It should also particularly be mentioned that by the conversion of the gold keratinic acids in accordance with the present invention into their alkaline earth metal salts a far reaching purification of these otherwise difficultly purifiable gold compounds is attained, since impurities are separated as insoluble alkaline earth metal salts in the treatment of the gold acids by the present process with the alkaline earth metal oxides, hydroxides or carbonates concerned, whereas the desired compounds on interaction in aqueous solution are obtained dissolved and may be precipitated by the addition of alcohol or other organic solvents miscible with water.

It is seen from the above that also the solutions which are obtained according to the invention by the action of the said alkaline earth metal compounds on the dissolved gold keratinic acid compounds contain the alkaline earth metal salts of the gold keratinic acids in relatively pure form and that these solutions if desired can themselves be employed for therapeutic purposes without a separation of the salts being absolutely necessary.

The gold keratinic acids and the keratinates to be converted into the alkaline earth metal salts can be obtained in various ways. Thus, there are applicable for this purpose not only the keratinates and keratinic acids obtained by degradation of keratin-containing materials by alkaline or acid hydrolysis in the presence of reducing agents or with subsequent reduction, as, for example, the albumose-like keratin degradation products containing sulphhydryl groups obtained by acid degradation in the presence of tin, but also such as are obtained by simple acid degradation without simultaneous or subsequent reduction.

There can also be employed as starting materials keratin degradation products which are produced by enzymatic methods from the keratins.

All these degradation products are converted in the known manner into the gold keratinic acid which are then transformed into the alkaline earth metal salts by the present process.

The alkaline earth-gold keratinates, in particular the calcium salts, exhibit the particular advantage that in their therapeutic application they are free from the disturbing secondary phenomena which the hitherto known and employed gold preparations frequently exhibit. In addition they exhibit against pneumococci infection of the mouse excellent effects which the known gold keratinates do not exhibit to the same extent.

The following examples illustrate the invention:

Example 1

300 g. of hair are heated on the water bath with 1,200 cc. of 18% hydrochloric acid until the whole of the keratin has just passed into solution. The hydrolysate of this reaction mixture is suitably neutralized with ammonia and filtered from portions which separate. Into the clear neutral reacting filtrate 150 cc. of pure 15% gold chloride solution are introduced in portions, whereby at the conclusion of the introduction a finely divided precipitate commences to separate. The reaction liquid is now treated with caustic soda solution to a weak alkaline reaction, the solution allowed to stand for several hours and thereupon filtered from a little separated gold. By pouring the clear solution into five times the quantity of alcohol the sodium salt formed of the gold keratinic acid is precipitated first as a viscous oil. After 24 hours standing the alcohol is decanted, the residue dissolved in water and the solution filtered. The aqueous solution of the gold keratinate is acidified with acetic acid and treated with 3–4 times the quantity of alcohol, whereby the gold compound is separated as free acid. The fine grained precipitate is allowed to settle and the alcoholic liquid removed. The residue is again stirred with alcohol, filtered with suction and well washed with alcohol and then with ether. The product thus obtained is suspended in water and shaken with a suspension of calcium hydroxide until no further solution of the gold compound takes place. The alkaline reacting liquid is filtered from undissolved portions and the filtrate poured into alcohol. The calcium salt of the gold keratinic acid precipitates as a finely divided precipitate. It is filtered with suction and washed with alcohol and ether. It is freed from adhering difficultly soluble impurities by twice reprecipitating it from aqueous solution with alcohol. The calcium salt is obtained as an easily water soluble light yellow colored powder which contains 4.5 to 4.8% Ca and 11.0 to 11.5% Au.

Example 2

In the same manner as in Example 1 from hair, horn or wool, sodium gold keratinate or the free acid of the gold keratin compound is obtained. The suspension of the acid in water is shaken with a suspension of strontium hydroxide until interaction has taken place. From the clear filtered solution the strontium salt is precipitated by pouring into alcohol and purified by several reprecipitations. It is obtained as an easily water soluble powder.

Example 3

In the same manner as in Example 1 from hair, horn or wool, sodium gold keratinate is obtained which is converted into the free acid by precipitation with acetic acid with the addition of alcohol. The suspension of this compound in water is shaken with a suspension of magnesium oxide whereby the magnesium salt of the gold keratinic acid passes into solution. It is isolated after filtration of the solution by precipitation with alcohol. For purification from difficultly soluble constituents it is reprecipitated several times from aqueous solution and in this manner the magnesium salt obtained as an easily soluble light yellow colored substance.

Example 4

300 g. of horn are heated with 1,200 cc. of 18% hydrochloric acid on the water bath. After one hour there are added to the hydrolysis liquid 30 g. of tin in portions with good shaking in the course of half an hour. After this time has elapsed the whole liquid is neutralized with ammonia and filtered. Into the still acid clear solution hydrogen sulphide is passed to the complete precipitation of the tin sulphide. After the precipitate has been filtered with suction, into the clear solution, from which the dissolved hydrogen sulphide has been removed, for example, by means of a stream of indifferent gas such as carbon dioxide or by evacuation and which has been completely neutralized with ammonia, 150 cc. of a 15% gold chloride solution are introduced. Thereupon caustic soda lye is added to weak alkaline reaction, the solution allowed to stand for several hours and then filtered from any separated gold. By pouring the clear solution into five times the quantity of alcohol, the sodium salt of the gold keratinic acid is precipitated first as a viscous oil. By dissolving in water and repeated precipitation with alcohol the substance is obtained as a fine powder.

A 10% aqueous solution of the sodium gold keratinate is treated with hydrochloric acid up to a content of 1% HCl. This solution is practically neutralized by shaking with a suspension of magnesium carbonate. The liquid is filtered from undissolved portions and poured into alcohol. The magnesium salt of the gold keratinic acid is precipitated as a finely divided precipitate. It is filtered with suction and washed with alcohol and ether. For further purification it is reprecipitated from aqueous solution by pouring into alcohol.

Example 5

300 g. of horn are hydrolyzed with hydrochloric acid with simultaneous reduction with tin as in Example 4. The further treatment takes place up to the addition of the gold chloride solution in the same manner as in Example 4.

Now, however, the acid gold keratinate solution is rendered weakly alkaline by addition of a suspension of calcium hydroxide. After standing for several hours the whole is filtered from separated gold and the difficultly soluble calcium compounds. The clear solution is poured into five times the quantity of alcohol whereby the calcium gold keratinate separates as a fine precipitate. The precipitate is filtered with suction and is again dissolved in water, filtered from undissolved portions and the pure calcium salt of the gold keratinic acid precipitated by pouring into alcohol. It is obtained as a powder easily soluble in water.

Example 6

In the same manner as in Example 4 a 10% aqueous solution of the sodium gold keratinate is produced and acidified with hydrochloric acid. The acid solution is practically neutralized by shaking with a suspension of calcium carbonate. After the liquid has been filtered from undissolved portions it is poured into alcohol and the calcium salt of the gold keratinic acid obtained in an analogous manner to that described in Example 4. Instead of ethyl alcohol for the precipitation of the calcium salt of the gold keratinic acid also methyl alcohol, acetone and the like can be employed.

Of course, many changes and variations in the reaction conditions, etc., may be made by those skilled in the art in accordance with the principles set forth herein and in the claims annexed hereto.

What we claim is:

1. An alkaline earth metal gold keratinate.
2. A calcium salt of gold keratinic acid.
3. A magnesium salt of gold keratinic acid.
4. Process for the manufacture of alkaline earth metal salts of gold keratinic acid comprising reacting a gold keratinic acid with a basic alkaline earth metal compound.
5. Process as set forth in claim 4, wherein the soluble alkaline earth metal gold keratinate obtained is precipitated by means of a water-miscible organic solvent.
6. Process as set forth in claim 4, wherein the alkaline earth metal gold keratinic acid is precipitated from their aqueous solution by the addition of alcohol.
7. Process as set forth in claim 4, wherein a basic compound of calcium is caused to react with a suspension of the gold keratinic acid.
8. Process as set forth in claim 4, wherein a basic compound of calcium is caused to react with a solution of the gold keratinic acid.
9. Process as set forth in claim 4, wherein a basic compound of magnesium is caused to react with a suspension of the gold keratinic acid.
10. Process as set forth in claim 4, wherein a basic compound of magnesium is caused to react with a solution of the gold keratinic acid.
11. Process as set forth in claim 4, wherein the gold compounds obtained from the hydrolysates produced by acid treatment of keratins are employed as starting materials.
12. Process as set forth in claim 4, wherein the keratinates obtained by acid hydrolysis with reduction during the hydrolysis and converted into the gold compounds are employed as starting materials.
13. An alkaline earth metal salt of a gold compound of the reduced hydrolization products of a keratin containing material.
14. A calcium salt of a gold compound of the reduced hydrolization products of a keratin containing material.

15. A magnesium salt of a gold compound of the reduced hydrolization products of a keratin containing material.

16. A strontium salt of a gold compound of the reduced hydrolization products of a keratin containing material.

17. Process for the manufacture of alkaline earth metal salts of gold keratinates, comprising reacting an alkaline earth metal compound of the group consisting of the oxides, hydroxides and carbonates, with the free carboxylic group of a gold keratinate.

18. Process for the manufacture of alkaline earth metal salts of gold keratinic acids, comprising reacting the reduced degradation product of a keratin-containing substance with a gold salt and causing the formed gold keratinic acid to react with a basic earth metal compound.

19. Process for the manufacture of alkaline earth metal salts of gold keratinic acids, which comprises subjecting a keratin-containing substance to the action of hydrolyzing and reducing agents, causing the reduced product to react with a gold salt and then treating the gold keratinic acid with a basic compound of an alkaline earth metal.

20. Process for the manufacture of alkaline earth metal salts of gold keratinic acid, comprising reducing the degradation products of a keratin-containing material, causing the reduced product to react with a gold salt, neutralizing the reaction mixture with an alkali metal base, and treating the resulting gold complex in acidified condition with a basic, alkaline earth metal compound.

21. Process for the manufacture of alkaline earth metal salts of gold keratinic acid obtained by the degradation of keratins followed by conversion to the gold compound, comprising causing such gold compound in the free acid condition to react with a basic compound of an alkaline earth metal.

22. Process for the manufacture of alkaline earth metal salts of gold keratinic acid, which comprises degrading a keratin-containing material with reduction thereof during the degradation, causing the reduced product to react with a gold salt, and then treating the resulting gold complex in the free acid condition with a basic compound of an alkaline earth metal.

23. Process for the manufacture of alkaline earth metal salts of gold keratinic acid, which comprises reducing the degradation products of a keratin-containing material, causing the resulting material to react with a gold salt, and treating the resulting gold complex in the free acid condition with a basic compound of an alkaline earth metal.

24. Process as set forth in claim 11, wherein the keratin degradation product obtained by acid hydrolysis in the presence of tin and converted into the gold compound is employed as starting material.

ADOLF FELDT.
ADOLF SCHMITZ.

CERTIFICATE OF CORRECTION.

Patent No. 2,197,795. April 23, 1940.

ADOLF FELDT, ET AL.

It is hereby certified that error appears in the printed specification of the above numbered patent requiring correction as follows: Page 2, second column, line 49, claim 6, for the word "their" read --its--; line 68, claim 12, for "keratinates" read --keratin degradation product--; lines 70 and 71, same claim, for "are employed as starting materials." read --is employed as starting material.--; page 3, first column, line 14, claim 17, for "keratinate" read --keratinic acid--; and second column, line 27, claim 24, for the claim reference numeral "11" read --4--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.